(12) United States Patent
Al-Khateeb

(10) Patent No.: US 6,938,605 B2
(45) Date of Patent: Sep. 6, 2005

(54) OIL COOLING SYSTEM TO PROVIDE ENHANCED THERMAL CONTROL FOR COMBUSTION ENGINES

(76) Inventor: Osama Othman Mostaeen Al-Khateeb, P.O. Box 2145, Safat 13022 (KW)

(*) Notice: Subject to any disclaimer, the term of this patent is extended or adjusted under 35 U.S.C. 154(b) by 0 days.

(21) Appl. No.: 10/753,812

(22) Filed: Jan. 8, 2004

(65) Prior Publication Data
US 2005/0150470 A1  Jul. 14, 2005

(51) Int. Cl.[7] .................................................. F01P 11/08
(52) U.S. Cl. ........................... 123/196 AB; 123/41.33; 123/41.42; 184/104.3
(58) Field of Search ...................... 123/196 AB, 41.33, 123/41.42, 41.48, 41.52, 195 C, 198 E; 184/104.3; 180/229; 165/44

(56) References Cited

U.S. PATENT DOCUMENTS

| | | | | |
|---|---|---|---|---|
| 4,027,643 A | * | 6/1977 | Feenan et al. | 123/196 AB |
| 4,399,774 A | * | 8/1983 | Tsutsumi | 123/41.1 |
| 5,980,340 A | * | 11/1999 | Okamoto | 440/88 L |
| 6,536,381 B2 | * | 3/2003 | Langervik | 123/41.33 |
| 6,708,665 B1 | * | 3/2004 | Lehmann | 123/196 AB |

* cited by examiner

Primary Examiner—Weilun Lo
(74) Attorney, Agent, or Firm—Michael I Kroll (57) ABSTRACT

An oil cooling system to provide enhanced thermal control for internal combustion engines wherein the oil cooling system of the present invention works in conjunction with the standard oil lubrication circuit and typical liquid coolant system of an engine to maintain the engine temperature in a constant range even when operated in an environment with extreme thermal conditions for a prolonged period of time. The present invention detects when the oil temperature has exceeded a pre-determined range and sends the oil to a radiator with heat sinks and a fan for extracting the heat therefrom and dissipating it before recycling it back to the oil sump where it serves to lubricate and cool the heat-generating components it comes in contact with.

17 Claims, 7 Drawing Sheets

OIL COOLING SYSTEM TO PROVIDE ENHANCED THERMAL CONTROL FOR COMBUSTION ENGINES

BACKGROUND OF THE INVENTION

1. Field of the Invention

The present invention relates generally to cooling systems for combustion engines and, more specifically, to an oil cooling system to provide enhanced thermal control for combustion engines utilizing an oil cooling system that will maintain the temperature of the oil that lubricates the engine components and will work in parallel with the traditional liquid cooling systems currently in use to prevent an engine from overheating even under extreme conditions.

Extreme heat conditions wreak havoc with combustion engines when the liquid coolant systems are unable to effectively maintain adequate thermal control of the engine because they only cool the cylinder head thereby resulting in overheating and possible engine damage. The oil lubricating the engine likewise increases in temperature as it passes through the heated components and serves to further transfer the heat to other related components thus contributing to the overheated condition rather than rectifying it. Furthermore, a high oil temperature greatly increases the rate of viscosity breakdown thereby compromising the effectiveness of the lubricating properties of the oil which could lead to engine damage.

The present invention seeks to overcome the shortcomings of the prior art by introducing a means for maintaining the oil within the oil sump at a predetermined temperature range in order to act as a secondary coolant system working in parallel with the standard liquid coolant system to provide improved thermal control thereof. The cooled oil is returned to the sump rather than introduced to the engine so as to avoid a sudden temperature change therein which could lead to a very dangerous and expensive engine failure. The oil cooling system of the present invention serves to cool all of the engine components that the oil comes in contact with while the liquid cooling system cools only the cylinder head.

The oil pump of the present invention is constantly in operation as the engine is running and the thermo-reactive valve remains closed under normal thermal conditions thereby routing the oil through a bypass conduit and by-pass valve that returns the oil to the sump. This provides a continuous flow of oil from the sump in order to maintain physical contact with the temperature sensors for accurate and immediate representation of the oil temperature being fed into the engine from the sump. The by-pass valve is always open during normal operating conditions to relieve pressure build-up since the pump is operating at all times even when the thermo-reactive valve is closed. It also prevents oil degradation from the high pressure and heat that would result therefrom. The by-pass valve closes during high temperature conditions to prevent pressure loss into the radiator due to oil traveling through the by-pass conduit.

The oil cooling system of the present invention is flexible and may be adapted to accommodate a plurality of applications according to the needs of the engine to be cooled and the environmental conditions under which it will be used. There are many variables that may be factored in when designing the specifications of the oil cooling system for a particular application such as the high limit settings of the temperature sensors, the size of the radiator and fan, the rate and amount of oil flow through the radiator as determined by the oil pump and conduit diameter.

The oil cooling system of the present invention may be manufactured into new engines or may be independent and retrofit to existing engines.

2. Description of the Prior Art

There are other cooling systems for combustion engines, while these cooling systems may be suitable for the purposes for which they were designed, they would not be as suitable for the purposes of the present invention, as hereinafter described.

SUMMARY OF THE PRESENT INVENTION

A primary object of the present invention is to provide an oil cooling system for combustion engines wherein an oil cooling system works in parallel with the liquid coolant system to maintain a lower core temperature in the engine when operated for extended periods in a heated environment.

Another object of the present invention is to provide an oil cooling system for combustion engines having a thermo-reactive valve that opens to provide passage to the oil cooling radiator when the oil temperature rises above a preselected point.

Still another object of the present invention is to provide an oil cooling system for combustion engines wherein the oil is removed from the oil sump by an oil pump where it is then cooled by the oil cooling radiator and a fan before being returned to the sump.

Yet another object of the present invention is to provide an oil cooling system for combustion engines wherein the thermo-reactive valve gradually closes as the oil temperature drops below a predetermined level.

Another object of the present invention is to provide an oil cooling system for combustion engines that will retard viscosity breakdown of the oil when used in an environment with extreme heat.

Yet another object of the present invention is to provide an oil cooling system having it's own oil filter thereby providing a secondary filter to work in parallel with the oil filter integrated with the standard lubrication system of the engine.

Still another object of the present invention is to provide an oil cooling system for combustion engines that is simple and easy to use.

Still yet another object of the present invention is to provide an oil cooling system for combustion engines that is inexpensive to manufacture and operate.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

DESCRIPTION OF THE REFERENCED NUMERALS

Turning now descriptively to the drawings, in which similar reference characters denote similar elements throughout the several views, the figures illustrate the Oil Cooling System for Combustion Engines of the present invention. With regard to the reference numerals used, the following numbering is used throughout the various drawing figures.

10 Oil Cooling System for Combustion Engines
12 engine
14 oil sump of 12
16 oil
18 oil pump
20 electric heat switch
22 temperature sensor of 20
24 thermo-reactive valve
26 thermo-static expansion valve
27 electric by-pass valve
28 oil filter
30 oil conduit
32 intake line
34 intake port
36 return line
37 counter-backflow loop of 36
38 outlet port
40 by-pass conduit
42 oil-cooling radiator
43 heat sinks of 42
44 oil lubrication circuit of 12
46 fan
48 power source
50 liquid coolant system of 12
52 strainer element
54 cylinder head
56 oil fill port
57 fill cap
58 oil drain
60 first electrical wire from positive terminal to electric heat switch
62 second electrical wire from electric heat switch to fan
64 third electrical wire from fan to negative terminal
66 fourth electrical wire from electric by-pass valve to 62
68 fifth electrical wire from electric by-pass valve to 64
70 negative terminal of 48
72 positive terminal of 48

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Figure 1:
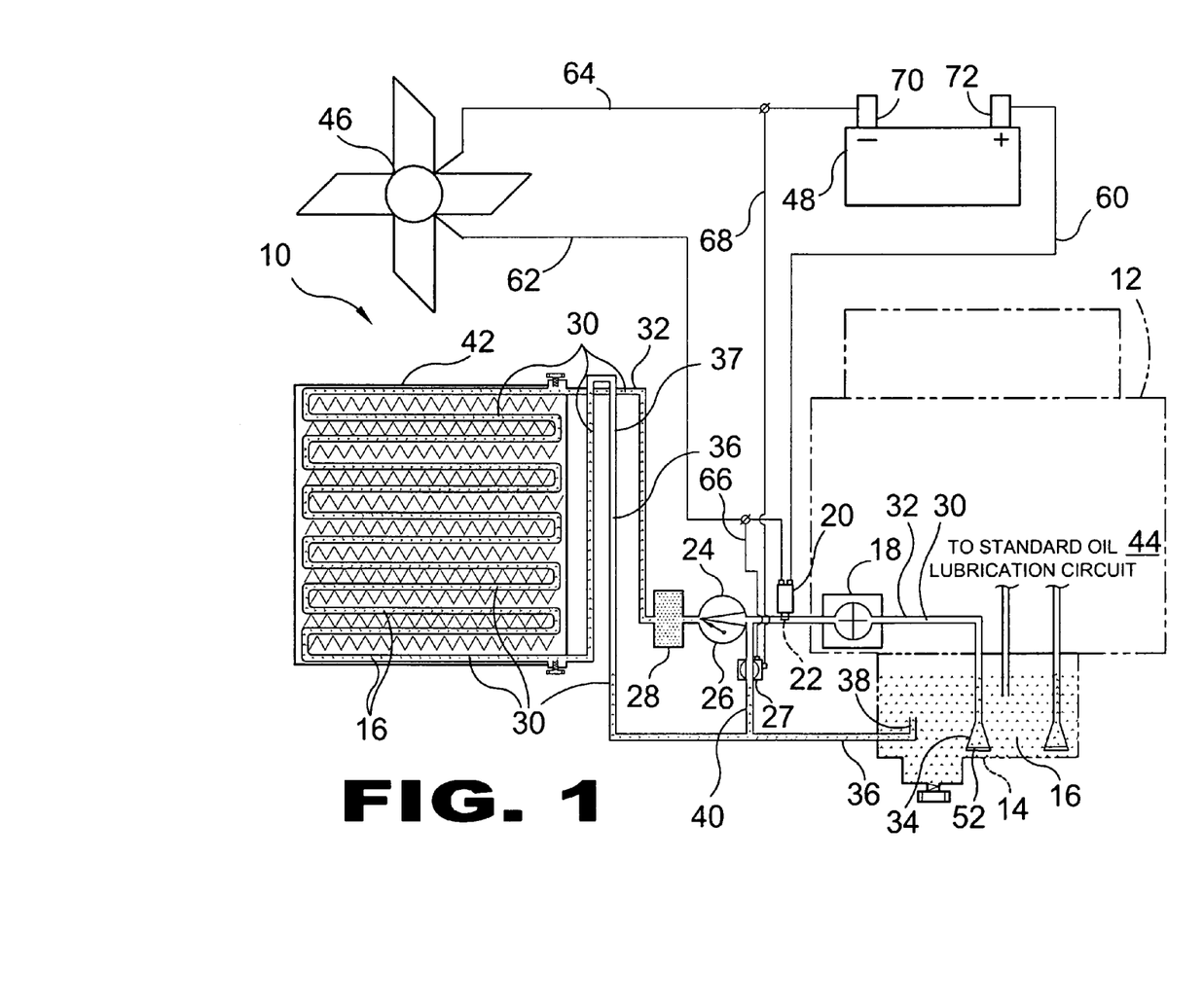
FIG. 1 is a schematic view of the present invention.

FIG. 1 is a perspective view of the present invention 10. The present invention 10 is an oil cooling system 10 that serves to provide thermal control for combustion engines 12. The present invention 10 includes an oil pump 18 that continuously draws oil 16 from the oil sump 14 of the engine 12 through an intake port 34 with a strainer element 52 that will prevent any particulate matter in the sump 14 from entering the oil cooling system 10 and returns the oil 16 to the sump 14 through a return line 36 which is the portion of the oil conduit 30 proximal the oil outlet port 38 which serves as the point of egress of the oil 16 back into the sump. The intake port 34 is disposed on the distal end of the intake conduit 32 which is the portion of the oil conduit 30 proximal the point of entry of the oil 16 in the sump 14. The conduit 30 of the return line 36 has a counter-backflow loop 37 with the peak portion thereof level with or higher than the highest point of said intake conduit 32 to prevent the oil 16 from draining back into the sump 14 from the radiator 42 when the engine 12 is turned off. The temperature sensor 22 of the electrical heat switch 20 monitors the temperature of the oil 16 during operation of the engine 12. A thermo-reactive valve 24 such a thermo-static expansion valve 26 remains closed during normal operating conditions routing the oil 16 through a by-pass conduit 40 back to the sump 14 and responds accordingly to a high oil 16 temperature condition by gradually opening as the heat of the oil 16 increases thereby permitting the flow of oil 16 into the radiator 42. An electrical by-pass valve 27 is in line with the by-pass conduit 40 and is always open until the thermo-reactive valve 24 is fully open whereupon the by-pass valve 27 closes and remains as such until the electric heat switch 20 opens the circuit. The oil 16 is diverted through an oil filter 28 to a radiator 42 cooled by a fan 46 that is activated by the temperature sensor 22 of the electrical heat switch 20 closing the circuit between the power source 48 and the fan 46 when a high temperature condition is detected and the by-pass valve 27 closes simultaneously. The DC power source 48 has a positive terminal 72 and a negative terminal 70. The value of the high temperature condition required to activate the electrical heat switch 20 should be equal to the temperature required to fully open the thermo-reactive valve 24. The present invention 10 works in conjunction with the oil lubricating system 44 of the engine 12 and may be manufactured integral with new engines 12 or retrofit to existing ones. The electrical circuit includes a first electrical wire 60 from the positive terminal 72 of the power supply 48 to the electrical heat switch 20, a second electrical wire 62 from the electrical heat switch 20 to the fan 46, a third electrical wire 64 from the fan 46 to negative terminal 70, a fourth electrical wire 66 from the electric by-pass valve 27 to the second electrical wire 62 and a fifth electrical wire 68 from by-pass valve 27 to the third electrical wire 64.

Figure 2:
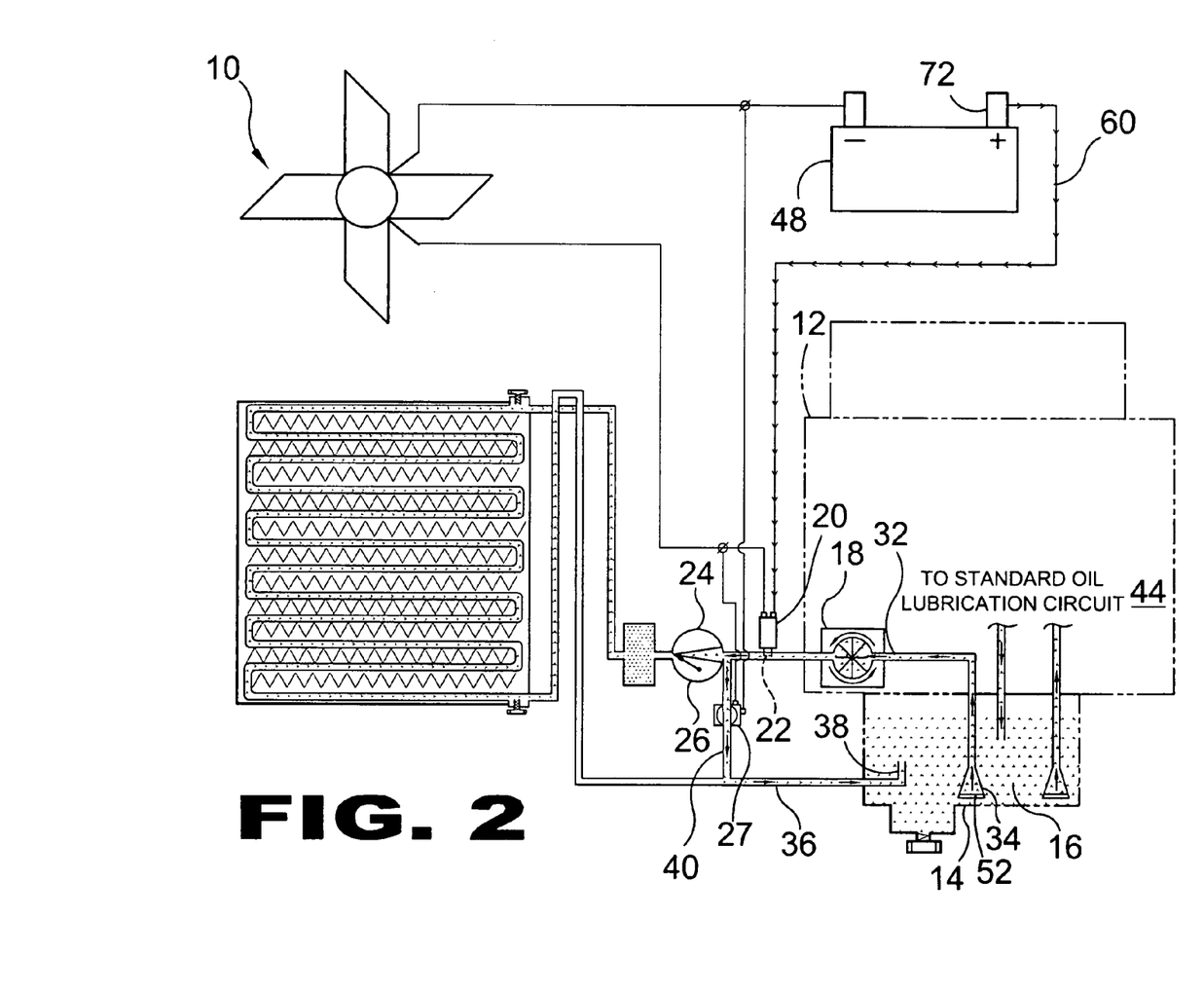
FIG. 2 is a schematic view of the present invention during normal operating conditions.

FIG. 2 is a schematic view of the present invention 10 during normal operating conditions. Shown is the present invention 10 in use with an operating engine 12. The oil pump 18 is drawing oil 16 from the oil sump 14 and transporting it through the strainer element 52 in the intake port 34 to the intake line 32 past the temperature sensor 22 of the electrical heat switch 20 which is open to a thermo-reactive valve 24 such as a thermostatic expansion valve 26 that remains closed for as long as the oil 16 remains below a specified range thereby returning the oil 16 to the oil sump 14 via the by-pass conduit 40 and by-pass valve 27 which is open and leading to the return line 36. The oil 16 is returned to the oil sump 14 through the outlet port 38 where it is introduced to the engine's 12 standard oil lubrication circuit 44. The oil pump 18 operates continuously during the operation of the engine 12 to provide for accurate and constant monitoring by the sensor 22 and the thermo-reactive valve 24 of the temperature of the oil 16 in the oil sump 14 being used to lubricate the engine 12 components. The first electrical wire 60 is connected to the positive terminal 72 of the battery 48 and is energized once the motor 12 is operating but current (indicated by arrows) is stopped at the electrical heat switch 20 which is open.

Figure 3:
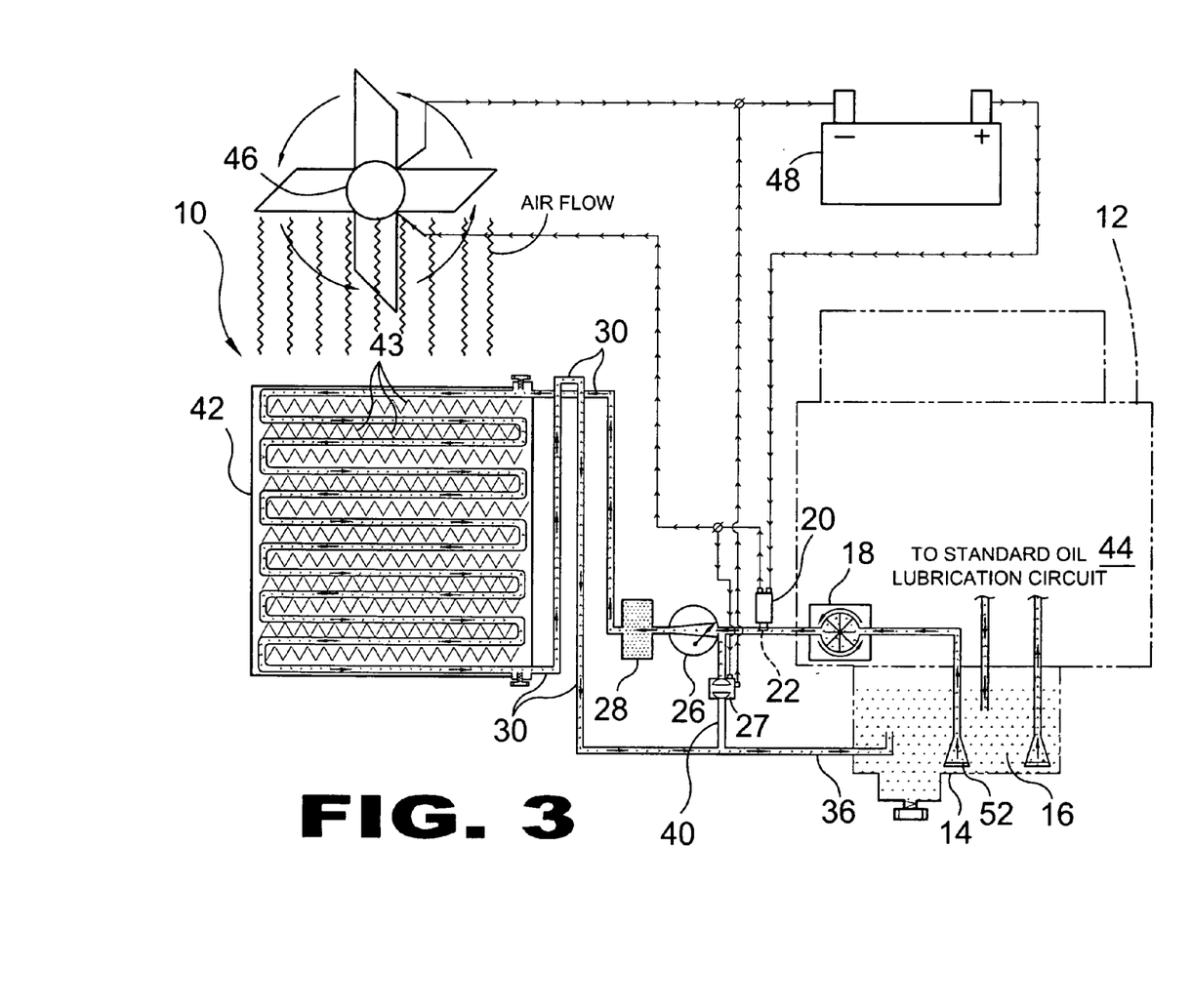
FIG. 3 is a schematic view of the present invention during high temperature operating conditions.

FIG. 3 is a schematic view of the present invention 10. Shown is the present invention 10 in use with an operating engine 12 during a high oil 16 temperature condition. The operation of the engine 12 mechanically drives the oil pump 18 during all phases of operation. The sensor 22 of the electrical heat switch 20 detects the high temperature condition and closes to complete the circuit between the power source 48 and the fan 46 to initiate the operation thereof. The by-pass valve 27 is simultaneously closed by the electrical current introduced thereto by the closing of the electrical heat switch 20 thereby prohibiting oil 16 through the by-pass conduit 40. The thermostatic expansion valve 26 opens due to the high temperature of the oil 16 and diverts it through the radiator 42 where the heat is transferred to the oil conduit 30 and drawn away by the heat sinks 43 and dispersed by the air flow created by the fan 46. The cooled oil 16 is returned to the sump 14 through the return line 36 where it is then used by the standard lubrication circuit 44 to lubricate and cool the engine 12 components. The present invention 10 serves to maintain a reasonable operating temperature of the engine 12 even during extreme conditions and to prevent viscosity breakdown of the oil that occurs under such conditions. The oil filter 28 of the present invention 10 serves to remove any small solids which may have passed through the strainer element 52 upon entry. The strainer element 52, oil filter 28 of the present invention 10 and conventional oil filter of the engine 12 serve to provide multi-tiered filtration of the oil 16.

Figure 4:
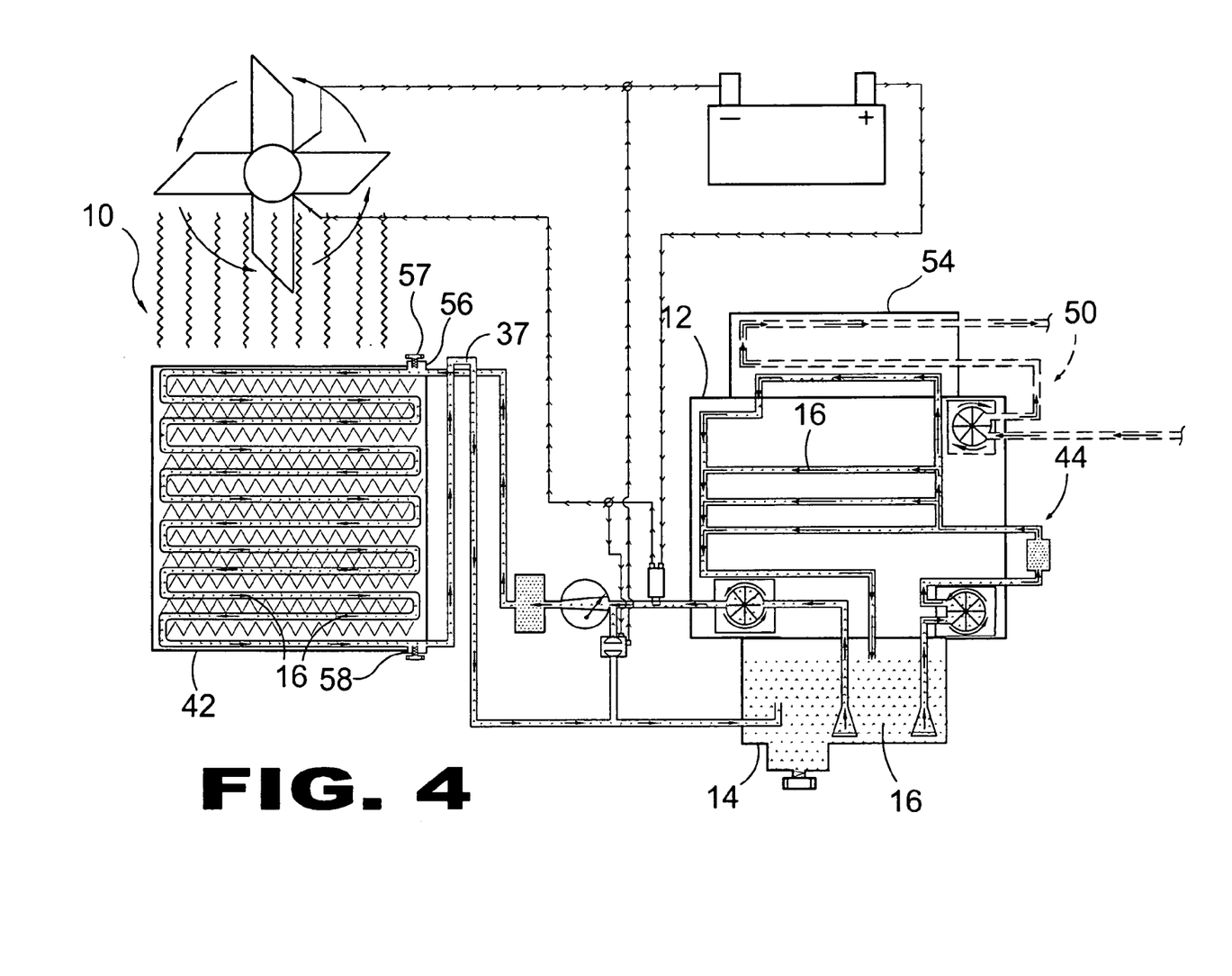
FIG. 4 is a schematic view of the present invention and engine lubrication and liquid cooling systems during high temperature operating conditions.

FIG. 4 is a schematic view of the present invention 10 and engine 12 during a high temperature condition wherein the path of the oil 16 in the sump 14 that is cooled by the present invention 10 and used by the engine 12 through a standard oil lubrication circuit 44 for the lubrication and cooling of the engine 12 is shown. The path of a typical liquid coolant system 50 through the engine 12 is shown in hidden line. Please note that the present invention 10 used in conjunction with a standard oil lubrication circuit 44 and typical liquid coolant system 50 provides the engine 12 with a vastly greater degree of thermal control than the typical liquid coolant system alone 50 which only cools the cylinder head 54. The oil-cooling radiator 42 has an oil fill port 56 with fill cap 57 and an oil drain 58 to provide flexibility when performing maintenance thereupon due to the difficulties that would be encountered due to the presence of the counter-backflow loop 37.

Figure 5:
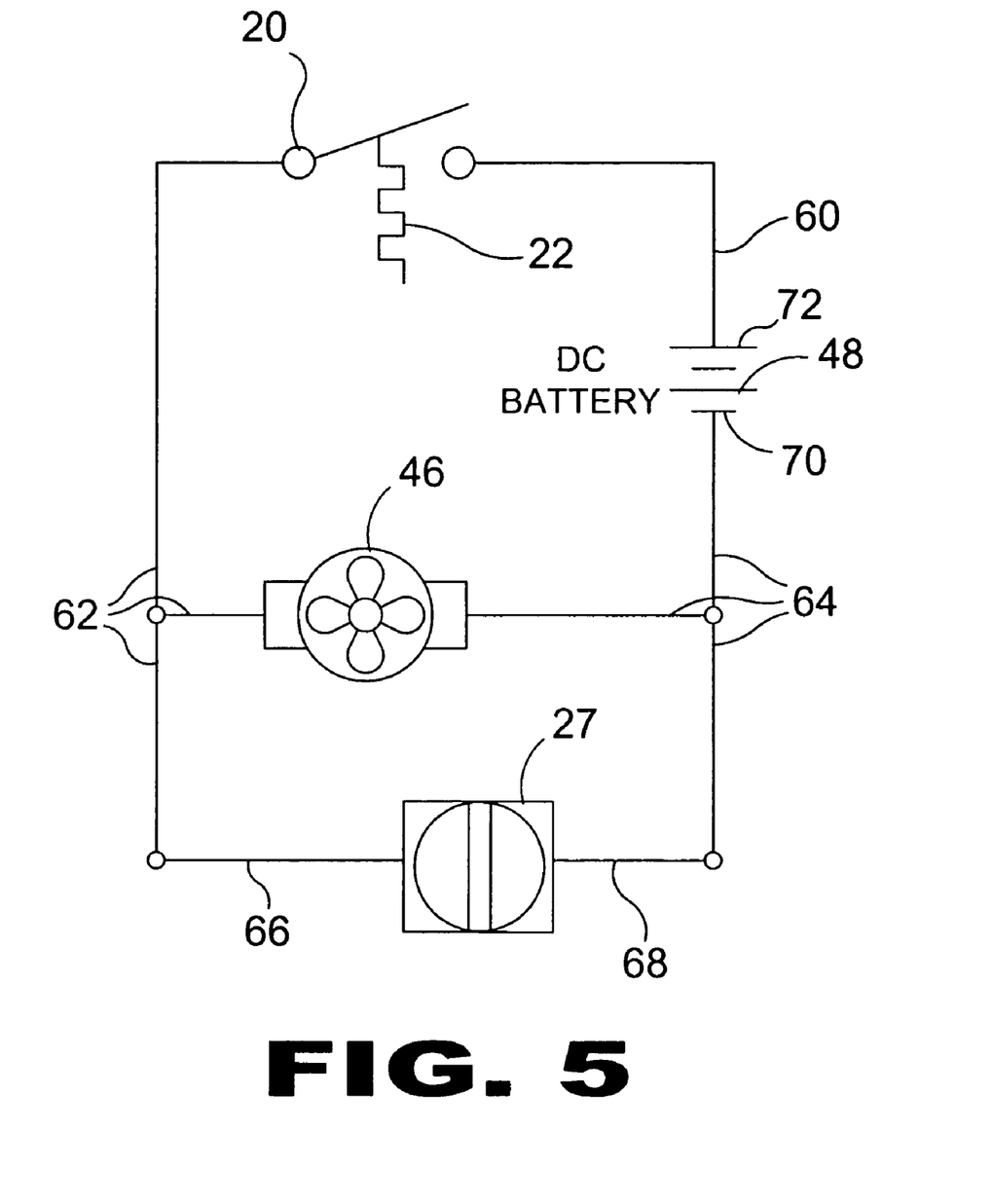
FIG. 5 is a schematic diagram of the electrical operation of the present invention.

FIG. 5 is an electrical schematic of the present invention Depicted is the electrical path of the electrical heat switch 20, the electric by-pass valve 27 and the fan 46 in relation to a DC power source 48. Current is applied to the first electrical wire 60 from the positive terminal 72 as soon as the engine starts operating but travels no further upon reaching the electrical heat switch 20 which remains open until a high temperature condition is detected by the temperature sensor 22. When the oil reaches a preset temperature, the temperature sensor 22 will close the electrical heat switch 20 to deliver current to the second electrical wire 62 and enable the cooling fan 46 and to the fourth electrical wire 66 to close the by-pass valve 27 with the fifth electrical wire 68 connecting with the third electrical wire 64 leading back to the negative terminal 70. When the oil temperature drops below the preset temperature, the electrical heat switch 20 opens in response to the temperature sensor 22 and disables the fan 46 and opens the by-pass valve 27. The temperature sensor 22 may be variable thereby permitting the preset temperature for fan 46 and by-pass valve 27 activation to be adjusted accordingly but is preferably set to respond to a temperature equal to that required to fully open the thermo-reactive valve.

Figure 6:
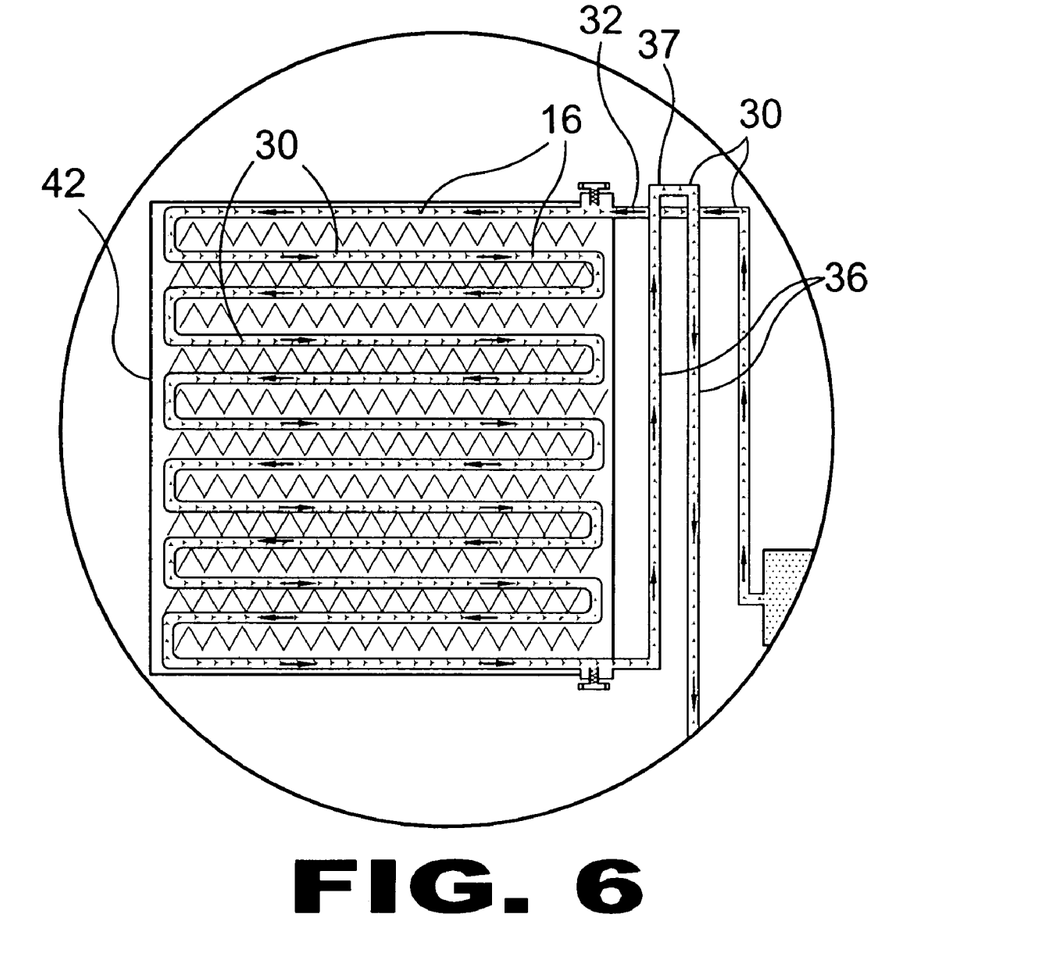
FIG. 6 is a detail view of the radiator of the present invention.

FIG. 6 is a detail view of the radiator 42 of the present invention demonstrating the oil 16 flow through the conduit 30 passing therethrough. The conduit 30 of the return line 36 has a counter-backflow loop 37 with the peak portion thereof level with or higher than the highest point of said intake conduit 32 to prevent the oil 16 from draining back into the sump from the radiator 42 when the engine is turned off.

Figure 7:
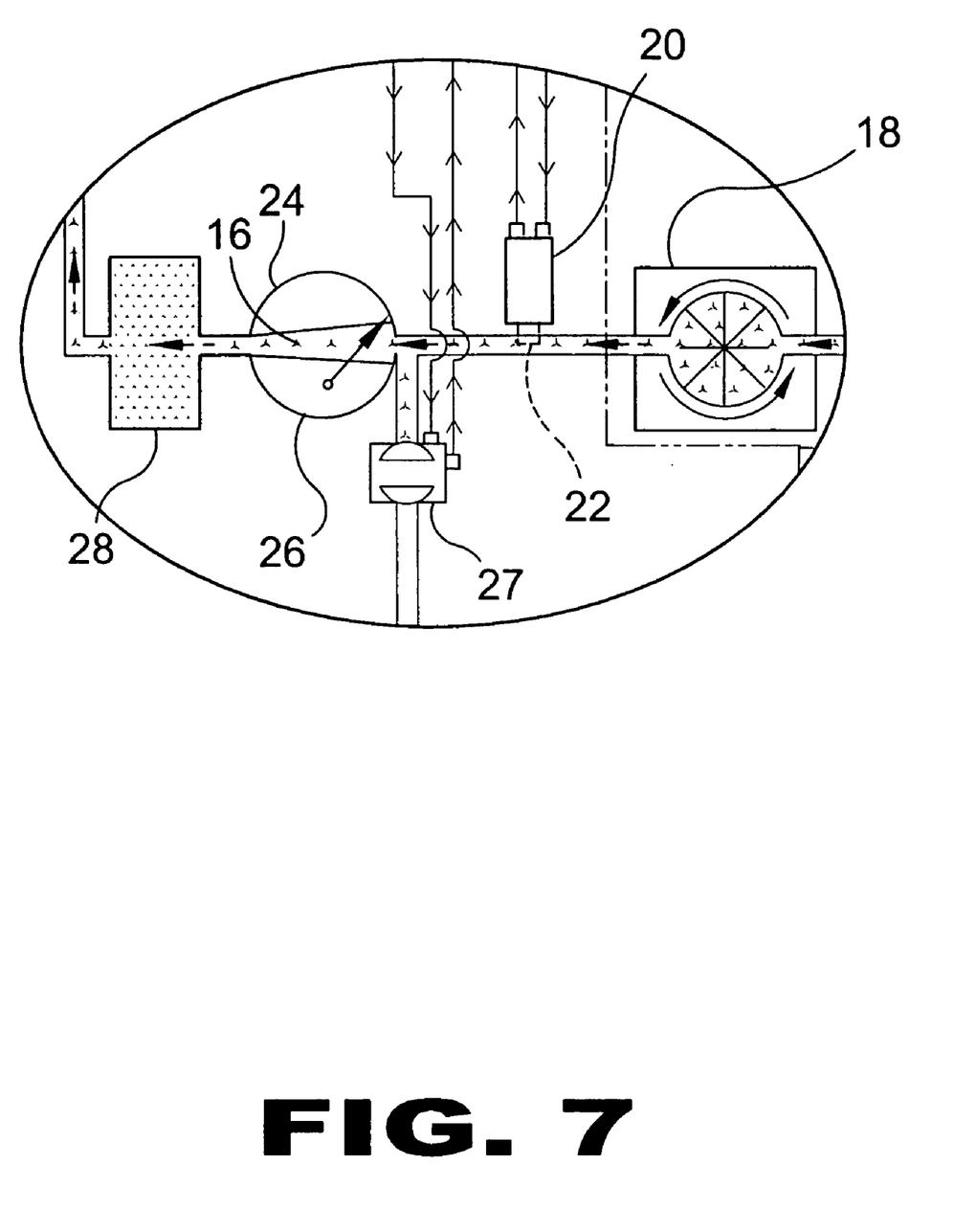
FIG. 7 is a detail view of the oil pump, the electrical heat switch and sensor, by-pass valve, thermo-reactive valve and oil filter of the present invention during a high temperature condition.

FIG. 7 is a detail view of the oil pump 18, the electrical heat switch 20 and its sensor 22, the oil filter 28, the open thermo-reactive valve 24 shown here as a thermo-static expansion valve 26 which is fully open and the closed by-pass valve 27 during a high oil 16 temperature condition.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An oil cooling system for combustion engines comprising:
   a) means for transporting oil from a sump and returning it thereto;
   b) means for cooling said oil when the temperature thereof exceeds a pre-selected high limit; and
   c) a thermo-reactive valve that prohibits oil flow into said oil cooling means until the temperature of said oil reaches said pre-selected high limit and responds accordingly by opening and encouraging the flow of oil into said oil cooling means as long as said high limit condition exists, wherein said oil transport means comprises;
a) an oil cooling conduit for transferring said oil through the cooling cycle, said conduit including an intake line having an intake port on the distal end thereof and a return line having an outlet port on the distal end thereof wherein said intake port and said outlet port are disposed within a lower portion of said oil sump;
b) an oil pump in line with said oil conduit for cycling said oil through said oil cooling system;
c) a by-pass conduit in fluent communication with said return line and said intake line disposed between said oil pump and said thermo-reactive valve; and
d) an electrical by-pass valve in line with said by-pass conduit to selectively permit or restrict said oil from passing through said by-pass valve.

2. An oil cooling system for combustion engines as recited in claim 1, wherein said oil cooling means comprises:
a) a radiator through which said oil cooling conduit passes in a substantially serpentine manner wherein a plurality of heat sink elements are in physical engagement with said oil cooling conduit;
b) a fan to provide air flow over said radiator to disperse the radiant heat transferred to said conduit and heat sinks from said oil flowing therethrough.

3. An oil cooling system for combustion engines as recited in claim 2, further comprising an electrical heat switch in electrical communication between a power source, said fan, and said by-pass valve, wherein said electrical heat switch includes a temperature sensor in internal communication with said oil conduit.

4. An oil cooling system for combustion engines as recited in claim 3, wherein said oil pump is in operation whenever the engine is operating thereby providing a constant flow of oil from said oil sump to said temperature sensor of said electrical heat switch and to said thermo-reactive valve.

5. An oil cooling system for combustion engines as recited in claim 3, wherein said by-pass valve is wired in parallel with said fan so the two operate simultaneously as dictated by said electrical heat switch.

6. An oil cooling system for combustion engines as recited in claim 1, wherein during engine operation said oil pump pulls said oil from said oil sump and delivers it to said thermo-reactive valve which remains closed as long as the oil temperature remains below a predetermined temperature thereby routing said oil through said by-pass valve and back into said oil sump.

7. An oil cooling system for combustion engines as recited in claim 2, wherein said thermo-reactive valve responds to a high temperature condition once the oil exceeds a predetermined temperature by opening gradually and letting the heated oil travel therethrough to an oil filter and through said radiator where said heat sink elements draw the excessive heat therefrom.

8. An oil cooling system for combustion engines as recited in claim 3, wherein said temperature sensor of said electrical heat switch detects a high oil temperature level that is equivalent to the temperature required to fully open said thermo-reactive valve and closes and completes the electrical circuit to said oil cooling fan and said by-pass valve, wherein said by-pass valve closes to route all oil to said radiator and said fan activates to blow an air current through said oil cooling radiator and heat sink elements to disburse the excessive heat therefrom, thereby effectively reducing the temperature of said oil passing therethrough prior to returning it to said sump.

9. An oil cooling system for combustion engines as recited in claim 1, wherein said thermo-reactive valve is a thermostatic expansion valve.

10. An oil cooling system for combustion engines as recited in claim 1, wherein said intake port further includes a strainer element to prevent any foreign solid matter from entering the oil cooling system.

11. An oil cooling system for combustion engines as recited in claim 4, wherein said oil pump is mechanically driven by said engine during the operation thereof.

12. An oil cooling system for combustion engines as recited in claim 1, further including a counter-backflow loop wherein said conduit of said return line from said radiator is looped in an arrangement affording the highest portion thereof to be disposed on a horizontal plane at least equal to the highest point of said intake line to said radiator to prevent said oil within said oil cooling system from draining back into said sump when not in use thereby maintaining a consistent quantity of oil level within said sump and said engine that is not affected by the operation of the present invention.

13. An oil cooling system for combustion engines as recited in claim 1, that is manufactured integral with said engine.

14. An oil cooling system for combustion engines as recited in claim 1, that is independent and may be retrofit to existing engines.

15. An oil cooling system for combustion engines as recited in claim 2, wherein said radiator further includes an oil fill port with fill cap disposed on a top portion thereof to enable the user to add said oil as needed.

16. An oil cooling system for combustion engines as recited in claim 2, wherein said radiator further includes on oil drain to enable the user to selectively remove oil from said radiator.

17. An oil cooling system for combustion engines as recited in claim 2, wherein said oil cooling means further includes an oil filter to filter said oil prior to its introduction to said oil-cooling radiator thereby providing double filtration of said oil as said oil is also filtered through the oil filter of a typical engine once returned to said sump.

* * * * *